United States Patent
Kornhaas et al.

(10) Patent No.: US 8,930,076 B2
(45) Date of Patent: Jan. 6, 2015

(54) STEERING SYSTEM IN A VEHICLE

(75) Inventors: Robert Kornhaas, Spraitbach (DE); Achim Schoen, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 13/503,829

(22) PCT Filed: Sep. 9, 2010

(86) PCT No.: PCT/EP2010/063221
§ 371 (c)(1), (2), (4) Date: Sep. 12, 2012

(87) PCT Pub. No.: WO2011/054564
PCT Pub. Date: May 12, 2011

(65) Prior Publication Data
US 2012/0330509 A1    Dec. 27, 2012

(30) Foreign Application Priority Data
Nov. 4, 2009  (DE) .......................... 10 2009 046 375

(51) Int. Cl.
B62D 1/16      (2006.01)
B62D 5/04      (2006.01)
B62D 15/02     (2006.01)

(52) U.S. Cl.
CPC .. B62D 1/16 (2013.01); B62D 5/04 (2013.01); B62D 15/0265 (2013.01)

USPC ........................................................... 701/41

(58) Field of Classification Search
CPC ....................................................... B62D 5/04
See application file for complete search history.

(56) References Cited

U.S. PATENT DOCUMENTS

| | | | |
|---|---|---|---|
| 6,580,989 B1 | 6/2003 | Husain et al. | |
| 7,708,108 B2 * | 5/2010 | Miyasaka et al. | 180/402 |
| 2006/0129294 A1 | 6/2006 | Moser et al. | |
| 2009/0222168 A1 * | 9/2009 | Egenfeldt | 701/42 |

FOREIGN PATENT DOCUMENTS

| | | |
|---|---|---|
| CN | 1489821 | 4/2004 |
| DE | 100 42 308 | 11/2004 |
| DE | 10 2005 021 725 | 11/2006 |
| WO | WO 2004/065195 | 8/2004 |

OTHER PUBLICATIONS

International Search Report for PCT/EP2010/063221, dated Nov. 25, 2010.

* cited by examiner

*Primary Examiner* — John Q Nguyen
*Assistant Examiner* — Michael Kerrigan
(74) *Attorney, Agent, or Firm* — Kenyon & Kenyon LLP

(57) ABSTRACT

A steering system of a vehicle in the transmission path between the steering wheel and the point of application of a servo unit includes a coupling element which is adjustable between a closed position transmitting a steering movement and a decoupled open position.

16 Claims, 2 Drawing Sheets

STEERING SYSTEM IN A VEHICLE

BACKGROUND OF THE INVENTION

1. Field of the Invention

The present invention relates to a steering system in a vehicle.

2. Description of Related Art

It is known from published German patent application document DE 10 2005 021 725 A1 to detect an immediately impending collision of the vehicle with the aid of an on-board sensor device and to take specific measures in the vehicle as a function of collision parameters either for self-protection or for the protection of the other vehicle involved in the accident. These measures relate to actively displaceable safety components in the vehicle which are, for example, an integral part of the vehicle body or are connected to it. For example, in the case of published German patent application document DE 10 2005 021 725 A1, the front bumper cross beam may be displaced backwards in the vehicle's longitudinal direction for pedestrian protection with the aid of a displacement device.

Furthermore, it is also known to activate a driver assistance system for reducing the consequences of an accident by, for example, automatically initiating a braking operation as soon as an impending accident has been detected.

If the vehicle is equipped with an active steering system which makes it possible to produce a superimposed steering angle independent of the driver which may be superimposed on the steering angle requested by the driver, the activation of the active steering system may also be used for reducing the consequences of an accident. However, such active steering systems are available in only a few vehicles due to their complex design.

BRIEF SUMMARY OF THE INVENTION

An object of the present invention is to reduce the consequences of an accident by a steering intervention to be performed automatically using simple constructive measures.

The steering system according to the present invention includes a steering control element ordinarily designed as a steering wheel via which the driver transmits a desired steering angle to the steerable wheels of the vehicle via a steering shaft, a steering gear and a steering rack. Furthermore, a servo unit is provided for generating a supporting drive torque, the servo unit ordinarily being coupled via the steering gear which is situated in the transition between the steering shaft and the steering rack.

According to the present invention, it is provided that a coupling element is situated in the steering system in the transmission path between the steering wheel and the point of application of the servo unit, the coupling element being adjustable between a closed position and a decoupled open position. In the closed position, a continuous kinematic transmission path is present between the steering control element and the steerable wheels, so that steering movements generated by the driver are transmitted in a conventional manner. In contrast, the kinematic transmission path is interrupted in the decoupled open position of the coupling element, specifically in an area between the steering control element and the point of application of the servo unit, whereas the further transmission path between the servo unit and the steerable wheels continues to be closed. This offers the possibility of opening the coupling element in certain situations, in particular in dangerous situations, and then activating the servo unit for generating a steering movement which, however, does not continue as far as the steering control element due to the opened coupling element. This prevents automatically performed steering interventions via an activation of the servo unit from resulting in an abrupt rotational movement of the steering wheel, which represents a potential risk of injury for the driver.

The assisting torque generated via the servo unit is converted into a steering movement of the steerable wheels of the vehicle when the coupling is open. Since a rapid vehicle response is necessary for reducing the severity of an accident, in particular in the case of an immediately impending accident, the servo unit is able to generate a high torque without danger to the driver in order to perform a rapid steering movement.

The steering system according to the present invention is designed in particular as a passive steering system without the possibility of generating a superimposed steering angle. Nevertheless, it is possible to provide active steering systems having a superimposed steering gear for generating a driver-independent superimposed steering angle, with a coupling element designed according to the present invention between the steering control element and the point of application of the servo unit.

The coupling element is designed in particular as an electromechanical coupling which is adjustable between the closed position and the decoupled open position via electric actuating signals. For safety reasons, it is advantageous that in the de-energized state, the coupling element is in a closed position in which a continuous kinematic transmission path is present.

The coupling element is located between the steering control element and the point of application of the servo unit. For example, a division of the steering shaft into two parts is considered, the two steering shaft parts being connected to one another via the coupling element. However, it is also possible to position the coupling element in the area of an end face of the steering shaft, in particular in the transition area between the steering shaft and the steering gear.

The servo unit is an electric servo motor.

In the method for operating the steering system according to the present invention, the coupling element is put into the decoupled open position in the case of an impending accident, the accident situation preferably being detected by a surroundings sensor installed in the vehicle. However, it is also basically possible for the information of an impending accident or a dangerous situation to be transmitted into the vehicle from the outside, for example, via a vehicle-to-vehicle communication device.

It may be advantageous to link the opening of the coupling element to additional conditions, for example, in such a way that the coupling element is only put into the open position if at least one vehicle state variable lies within a defined range of values. This should ensure that no additional risks are associated with interrupting the steering connection. The vehicle velocity in particular is considered as a vehicle state variable which is observed, the coupling element being opened only if the vehicle velocity falls below a threshold value, for example, 15 km/h.

After the coupling element is opened, the servo unit is activated in order to generate a wheel steering angle, so that the vehicle is automatically steered in a specific direction, which is intended to reduce the severity of the consequences of an accident. Due to the open coupling element, the generation of the wheel steering angle does not spread to the steering wheel. The size and the direction of the wheel steering angle to be generated as well as other parameters characterizing the steering operation such as the starting and ending point of the wheel steering angle change and the speed of the wheel steering angle change are determined as a function of the instantaneous vehicle and surroundings situation. Normally, the intervention via the servo unit is used to attempt to reduce the consequences of an accident by moving the vehicle away from the other vehicle involved in the accident through the desired wheel steering angle deflection.

In addition to the automatic steering operation to be performed by activating the servo unit, it may be advantageous to automatically activate another actuating device in the vehicle, for example, a brake system. The steering operation and, if necessary, the activation of the additional actuating device as well, may be performed by a driver assistance system, for example, an electronic stability program (ESP).

The actuating signals for acting on the coupling element and the servo motor are generated in a regulating and control unit which may be, for example, the ESP control unit. The control unit communicates with the surroundings sensor or another sensor device, which is installed in the vehicle, or with a control unit which is assigned to the surroundings sensor or the additional sensor device. For example, airbag signals for detecting the accident situation are also usable.

DETAILED DESCRIPTION OF THE INVENTION

Figure 1:
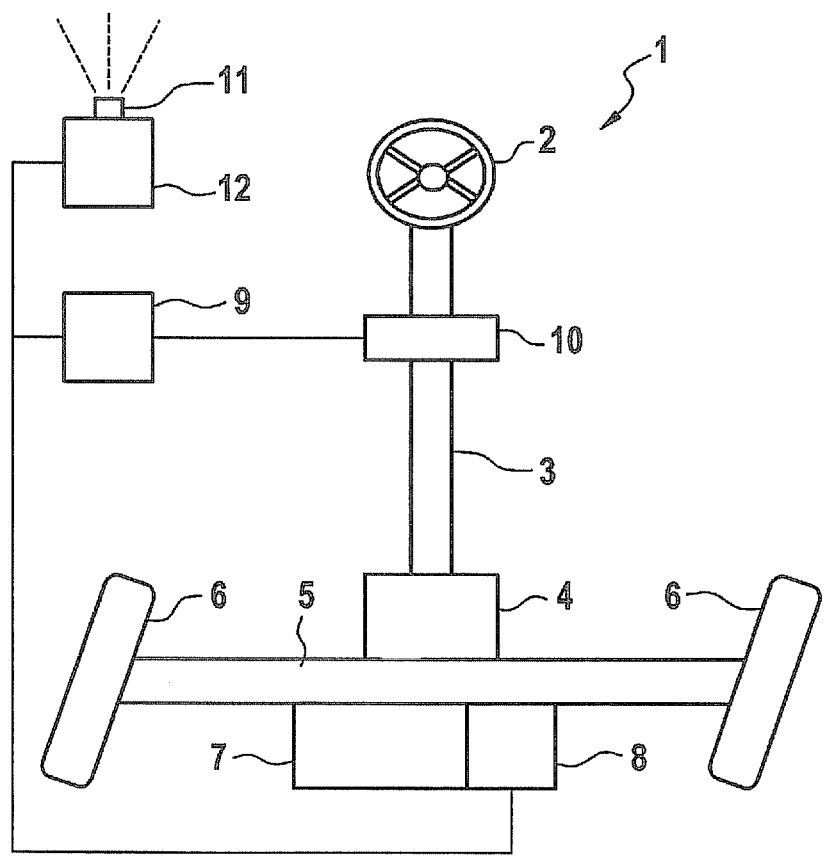
FIG. 1 shows a schematic diagram of a steering system which is equipped with an electric servo motor for power assisted steering, an electromechanical coupling element being integrated into the steering shaft.

Steering system 1 represented in FIG. 1 is installed in a motor vehicle and includes a steering wheel 2 as a steering control element, a steering column or shaft 3, a steering gear 4 and a steering rack 5. Steering wheel 2 is connected to steering shaft 3; the driver inputs a desired steering angle via steering wheel 2. The steering angle is transmitted via steering shaft 3 to steering gear 4 which is kinematically connected to steering rack 5 which applies a wheel steering angle to steerable wheels 6. For power assisted steering, an electric servo motor 7 is provided as a servo unit which is adjusted by actuating signals of a regulating and control unit 8, regulating and control unit 8 being, for example, the control unit of an electronic stability program (ESP).

An electromechanical coupling element 10 is integrated into steering shaft 3, the electromechanical coupling element being adjustable between a decoupled open position and a closed position transmitting a steering movement by actuating signals of a regulating and control unit 9. Regulating and control unit 9 which is assigned to coupling element 10 may also be, for example, the ESP control unit. Electromechanical coupling element 10 is closed when currentless, so that in the de-energized state of the coupling element, the two steering shaft parts, between which the coupling element is situated, are connected to one another kinematically and the steering movement input by the driver is transmitted directly between the steering shaft parts.

In contrast, in the open position of coupling element 10, the two steering shaft sections are decoupled from one another, so that on the one hand, a steering movement input by the driver via steering wheel 2 is not transmitted to steerable wheels 6, and on the other hand, movements that occur in the steering train below the coupling element are unable to spread to steering wheel 2.

Steering system 1 and regulating and control units 8 and 9, which are an integral part of the steering system, communicate with a surroundings sensor 11 and a regulating and control unit 12 assigned to the surroundings sensor. Surroundings sensor 11, including the assigned regulating and control unit, is installed in the vehicle and includes, for example, a long-range radar for detecting the traffic situation located or taking place ahead of the vehicle. As a function of the information delivered via surroundings sensor 11 and assigned regulating and control unit 11, the coupling element in steering shaft 3 may be moved into the open position. In the case of an immediately impending accident, this takes place in particular in order to generate a wheel steering angle via an activation of electric servo motor 7 independent of the driver action, and in doing so, steer the vehicle into a specific direction with the goal of reducing the consequences of an accident. Due to opened coupling element 10 in steering shaft 3, the steering movement which is generated by the activation of electric servo motor 7 is not able to spread to steering wheel 2, whereby the accident risk caused by an abrupt movement of the steering wheel not caused by the driver is excluded.

Figure 2:
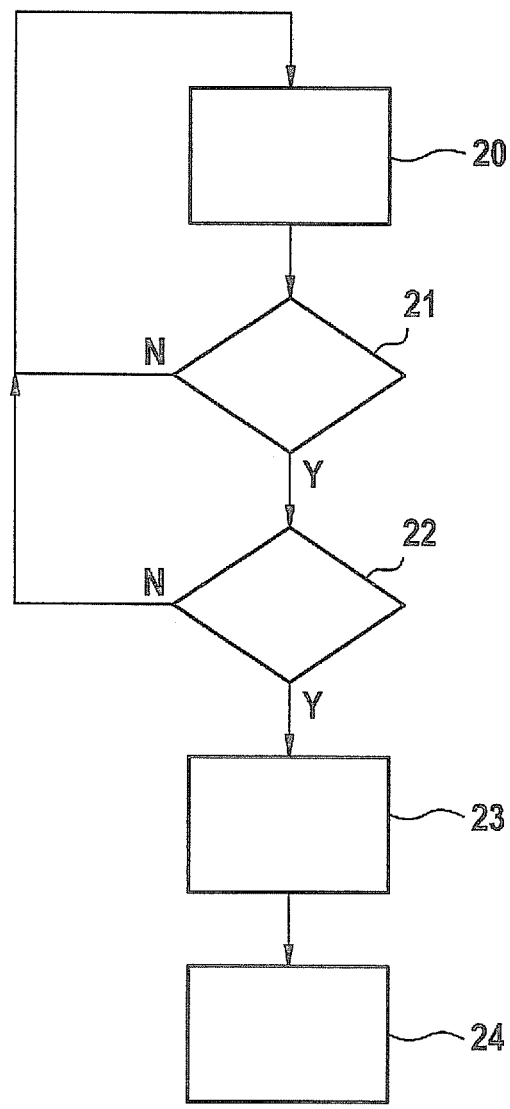
FIG. 2 shows a flow chart having method steps for implementing the method for operating the steering system according to FIG. 1.

A flow chart for implementing the method for operating the steering system in the case of an impending accident is represented in FIG. 2. Information from the surroundings sensor in the vehicle is initially collected and evaluated in a first method step 20. In following method step 21, it is checked if the information from the surroundings sensor makes it possible to infer an immediately impending accident. This occurs, for example, via a query as to whether the distance to a preceding vehicle or another object falls short of a threshold value, which is in particular a function of additional variables such as, for example, the vehicle's velocity. If the query in method step 21 shows that an accident is not immediately impending, the no branch ("N") is followed for returning to the beginning of the method according to method step 20. If, in contrast, the query shows that an accident is immediately impending, the method is continued following the yes-branch ("Y") to next method step 22.

Another check is made in method step 22 as to whether an additional parameter lies within the defined range of values, for example, the vehicle velocity falls below a threshold value of, for example, 15 km/h. The query in method step 22 is used as a safety query for ensuring that the serious intervention, which is associated with the opening of the coupling element, is performed only if it is not associated with an additional, significant endangerment.

If the answer to the safety query in method step 22 is negative, i.e., the checked state variable or parameter does not lie within the required range of values, the no-branch is again followed to the beginning of the method. Otherwise, all conditions for opening the coupling element are fulfilled and the method is continued to next method step 23 in which the coupling element is opened. This interrupts the kinematic connection between the steering control element and the steerable wheels.

In next method step 24, after the electromechanical coupling element is opened, an automatic intervention in the steering system is made via the electric servo motor. A high torque is generated via the servo motor which is fed into the steering system in order to generate a specific, desired wheel steering angle in this way. The direction and level of the desired wheel steering angle and the change speed of the wheel steering angle are also parameters that are set as a function of the instantaneous vehicle and surroundings situation.

What is claimed is:

1. A steering system in a vehicle, comprising: a steering wheel; a steering rack; a steering shaft via which the steering wheel is connectable to the steering rack; a servo unit for generating a supporting drive torque; a coupling element situated in a transmission path between the steering wheel and a point of application of the servo unit, wherein the point of application of the servo unit is more proximal to the steering rack than the steering wheel; and the coupling element is configured to be selectively adjusted between a closed position transmitting a steering movement from the steering wheel to the servo unit and a decoupled open position in which the servo unit is decoupled from the steering wheel; and a control unit that is configured to, responsive to an impending accident, move the coupling element into the decoupled open position.

2. The steering system as recited in claim 1, wherein the coupling element is situated in the steering shaft.

3. The steering system as recited in claim 2, wherein the coupling element is (i) configured to be activated electrically and (ii) in the closed position in the currentless state.

4. The steering system as recited in claim 3, wherein the servo unit is an electric servo motor.

5. The steering system as recited in claim 1, wherein the supporting drive torque is converted into a steering movement of a steerable wheel of the vehicle when the coupling element is moved into the decoupled open position.

6. The steering system as recited in claim 5, wherein in the case of the impending accident, the servo unit generates a high torque to perform a rapid steering movement, without an abrupt rotational movement of the steering wheel.

7. The steering system as recited in claim 1, wherein the steering system is designed as a passive steering system that is unable to generate a driver-independent superimposed steering angle.

8. The steering system as recited in claim 1, wherein the steering system is designed as an active steering system that includes a superimposed steering gear for generating a driver-independent superimposed steering angle.

9. The steering system as recited in claim 1, wherein the closed position is provided in a non-error state.

10. A method for operating the steering system having a steering wheel, a steering rack, a steering shaft via which the steering wheel is connectable to the steering rack, a servo unit for generating a supporting drive torque, and a coupling element situated in a transmission path between the steering wheel and a point of application of the servo unit, wherein the point of application of the servo unit is more proximal to the steering rack than the steering wheel, the method comprising: selectively adjusting, by a computer processor and in response to an impending accident, the coupling element from a closed position, transmitting a steering movement from the steering wheel to the servo unit, into a decoupled open position in which the servo unit is decoupled from the steering wheel.

11. The method as recited in claim 10, wherein the servo unit is activated for generating a wheel steering angle after the coupling element is opened.

12. The method as recited in claim 11, wherein the coupling element is opened only if at least one predefined vehicle state variable lies in a predefined value range.

13. The method as recited in claim 12, wherein the coupling element is opened only if the vehicle velocity falls below a predefined threshold value.

14. The method as recited in claim 12, wherein sensor signals of a surroundings sensor in the vehicle are evaluated for detecting an impending accident.

15. The method as recited in claim 12, wherein at least one additional actuating device in the vehicle is activated after the coupling element is opened.

16. A control unit for operating the steering system having a steering wheel, a steering rack, a steering shaft via which the steering wheel is connectable to the steering rack, a servo unit for generating a supporting drive torque, and a coupling element situated in a transmission path between the steering wheel and a point of application of the servo unit, wherein the point of application of the servo unit is more proximal to the steering rack than the steering wheel, the control unit comprising: means for selectively adjusting the coupling element, in response to an impending accident and only if the vehicle velocity falls below a predefined threshold value, from a closed position, transmitting a steering movement from the steering wheel to the servo unit, into a decoupled open position in which the servo unit is decoupled from the steering wheel.

* * * * *